(12) United States Patent
Geffert et al.

(10) Patent No.: US 11,706,305 B2
(45) Date of Patent: *Jul. 18, 2023

(54) METHODS AND APPARATUS FOR USER IDENTIFICATION VIA COMMUNITY DETECTION

(71) Applicant: The Nielsen Company (US), LLC, New York, NY (US)

(72) Inventors: Jan Laurens Geffert, New York, NY (US); Lisa Marie Hamilton, New York, NY (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,443

(22) Filed: Aug. 23, 2022

(65) Prior Publication Data

US 2022/0407930 A1    Dec. 22, 2022

Related U.S. Application Data

(63) Continuation of application No. 17/390,012, filed on Jul. 30, 2021, now Pat. No. 11,445,034.

(Continued)

(51) Int. Cl.
*G06F 15/16*      (2006.01)
*H04L 67/306*    (2022.01)
(Continued)

(52) U.S. Cl.
CPC ........ *H04L 67/306* (2013.01); *G06F 18/2323* (2023.01); *H04L 67/303* (2013.01)

(58) Field of Classification Search
CPC .. H04L 67/306; H04L 67/303; G06F 18/2323
(Continued)

(56) References Cited

U.S. PATENT DOCUMENTS

| 10,311,106 B2 | 6/2019 | Chrapko et al. |
| 10,607,148 B1 | 3/2020 | Niewczas |

(Continued)

FOREIGN PATENT DOCUMENTS

| KR | 10-2019-0139338 A | 12/2019 |
| WO | 2014/036119 A1 | 3/2014 |

OTHER PUBLICATIONS

International Searching Authority, "International Search Report," issued in connection with International Patent Application No. PCT/US2021/043918, dated Nov. 19, 2021, 3 pages.

(Continued)

*Primary Examiner* — Alan S Chou
(74) *Attorney, Agent, or Firm* — Hanley, Flight & Zimmerman, LLC

(57) ABSTRACT

Methods, apparatus, systems, and articles of manufacture for user identification via community detection are disclosed. Example instructions, when executed, cause at least one processor to at least access personally identifiable information to device links, build a device graph based on the personally identifiable information to device links, split components of the device graph into person clusters using community detection, create a snapshot including a device-to-person link lookup, and prepare a person-level impression measurement report from the snapshot.

20 Claims, 14 Drawing Sheets

Related U.S. Application Data

(60) Provisional application No. 63/058,993, filed on Jul. 30, 2020.

(51) Int. Cl.
   *H04L 67/303*     (2022.01)
   *G06F 18/2323*    (2023.01)

(58) Field of Classification Search
   USPC .................................................. 709/204
   See application file for complete search history.

(56) References Cited

U.S. PATENT DOCUMENTS

| | | |
|---|---|---|
| 11,445,034 B2 * | 9/2022 | Geffert ................. G06F 18/231 |
| 2012/0323686 A1 | 12/2012 | Burger et al. |
| 2015/0341453 A1 | 11/2015 | Miller et al. |
| 2016/0239868 A1 | 8/2016 | Demsey et al. |
| 2018/0192104 A1 | 7/2018 | Splaine et al. |
| 2018/0285921 A1 | 10/2018 | Levine et al. |
| 2018/0316665 A1 | 11/2018 | Caldera et al. |
| 2019/0122149 A1 | 4/2019 | Caldera et al. |
| 2020/0225815 A1 | 7/2020 | Ventura et al. |
| 2020/0349452 A1 | 11/2020 | Ragavan et al. |
| 2022/0038553 A1 | 2/2022 | Geffert et al. |

OTHER PUBLICATIONS

International Searching Authority, "Written Opinion," issued in connection with International Patent Application No. PCT/US2021/043918, dated Nov. 19, 2021, 3 pages.

United States Patent and Trademark Office, "Non-Final Office Action," issued in connection with U.S. Appl. No. 17/390,012, dated Jan. 19, 2022, 7 pages.

United States Patent and Trademark Office, "Notice of Allowance," issued in connection with U.S. Appl. No. 17/390,012, dated May 9, 2022, 7 pages.

Blondel et al., "Fast unfolding of communities in large networks," Journal of Statistical Mechanics: Theory and Experiment, vol. 2008, IOP Publishing Ltd, Oct. 9, 2008, 12 pages.

* cited by examiner

ALGORITHM SELECTION CHART

| | DATASET -> | KARATE | ARXIV | INTERNET | WEB ND. EDU | PHONE | UK-2005 | WEBBASE 2001 |
|---|---|---|---|---|---|---|---|---|
| NETWORK | NUMBER OF NODES | 34 | 9K | 70K | 325K | 2.6 M | 39M | 118M |
| | NUMBER OF EDGES | 77 | 24K | 351K | 1M | 6.3 M | 78.3M | 1B |
| SPEED | GIRVAN AND NEWMAN | 0 S | 3.6 S | 799 S | 5034 S | Null | Null | Null |
| | PONS AND LATAPY | 0 S | 3.3 S | 575 S | 6666 S | Null | Null | Null |
| | WAKITA AND TSURUMI | 0 S | 0.7 S | 62 S | 248 S | 464 S | Null | 118M |
| | LOUVAIN | 0 S | 0 S | 1 S | 3 S | 134 S | 738 S | 152 minutes |
| MODULARITY | GIRVAN AND NEWMAN | 0.38 | 0.772 | 0.692 | 0.927 | Null | Null | Null |
| | PONS AND LATAPY | 0.42 | 0.757 | 0.729 | 0.895 | Null | Null | Null |
| | WAKITA AND TSURUMI | 0.42 | 0.761 | 0.667 | 0.898 | 0.56 | Null | Null |
| | LOUVAIN | 0.42 | 0.813 | 0.781 | 0.935 | 0.769 | 0.979 | 0.984 |

METHODS AND APPARATUS FOR USER IDENTIFICATION VIA COMMUNITY DETECTION

RELATED APPLICATION

This patent arises from a continuation of U.S. patent application Ser. No. 17/390,012, which was filed on Jul. 30, 2021, which claimed priority to U.S. Provisional Application No. 63/058,993, U.S. Patent Application No. 63/058,993 and Ser. No. 17/390,012 are hereby incorporated herein by reference in their entireties. Priority to U.S. Patent Application No. 63/058,993 and Ser. No. 17/390,012 is hereby claimed.

FIELD OF THE DISCLOSURE

This disclosure relates generally to audience measurement and, more particularly, to methods and apparatus for user identification via community detection for impression deduplication and demographic variable assignment.

BACKGROUND

In recent years, media impressions have been measured using observed sign-ins through database proprietors (e.g., Facebook). The decline of this method and the blocking of third-party cookies and mobile advertising identifiers means that alternative identifiers (e.g., email, IP address, Smart TV ID, etc.) are being used. Unfortunately, data from such alternative identifiers can misrepresent the true quantity of impressions.

BRIEF DESCRIPTION OF THE DRAWINGS

FIG. 10 is a spreadsheet displaying run times of various algorithms for example bodies of impression data.

The figures are not to scale. Instead, the thickness of the layers or regions may be enlarged in the drawings. In general, the same reference numbers will be used throughout the drawing(s) and accompanying written description to refer to the same or like parts.

Figure 1:
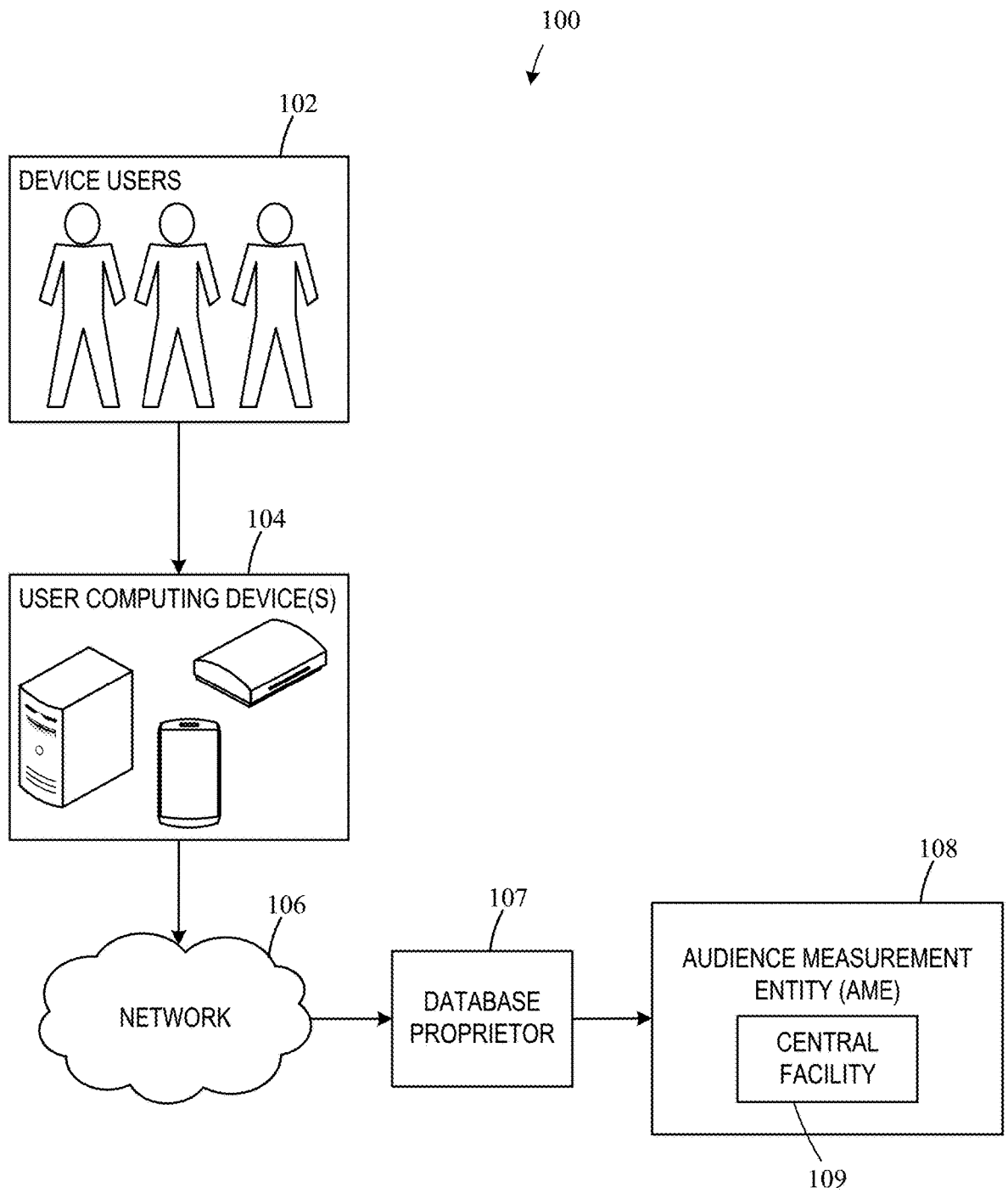
FIG. 1 is a block diagram illustrating interaction between device users, computing devices, and a central facility of an audience measurement entity to collect media impressions.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Example methods and apparatus disclosed herein deduplicate media impressions via community detection. Historically, media impressions originate from a single source (e.g., TVs, radio) and could be tracked and recorded individually by user. More recently, consumers own and use multiple devices (e.g., computer, smart phone, smart TV, tablet) each with the ability to consume media, complicating the accurate recording of media impressions.

When users consume media across a variety of devices, it can be difficult to decern how many impressions have occurred. For example, a user could begin watching a television show on a phone, continue watching on a TV, and finish watching on a tablet. Previously, this problem was approached by using observed sign-ins from database proprietors (e.g., Facebook). The database proprietor could differentiate between distinct and repeated media impressions based on known device sign-ins. In addition, they could provide demographic data associated with the accounts to the audience measurement entity. With recent disruptions in the online advertising ecosystem including the blocking of third-party cookies and digital ad identifiers (e.g., IDFAs), alternative methods of matching users to media impressions are used, such as the use of personally identifiable information (PII) to device links.

One example of a link is the linking of hashed emails and their observed device sign-ins (e.g., a PII to device link), such as logins into email-associated third-party website and app accounts. Different types links may additionally or alternatively may be used such as, for example, a PII to PII link (e.g., a link between an email address and a cookie ID). Unfortunately, the aggregation of hashed emails linked to devices can create large, connected components (LLCs). LLCs are clusters of devices connected to one another by known links (e.g., email sign-ins) and can contain thousands or millions of emails and devices. This is because, while hashed emails can be used as a proxy for impression identification, unlike database proprietor accounts, users often have more than one email account. In addition, emails associated with accounts for media consumption websites (e.g., New York Times, CNN.com, Netflix, Hulu, Amazon Prime Video, etc.) are often shared between individuals and devices, which can further obscure the true person associated with the impression. This lack of one-to-one match between users, devices, and PII can produce duplicated impressions, and thus, the true number of impressions can be misrepresented.

Duplicate impressions can be, in some examples, multiple impressions measured for one individual or multiple impressions merged into one individual. Although not limited to the following, there exist two common examples of how duplicated impressions can develop. In a first example, a device or collection of devices are shared amongst multiple users such that the device ID cannot be assigned to one single person ID. When each user signs in to the shared device, their person ID and impressions become associated with the device. When these person IDs and impressions become aggregated over many different users, it is unknown with which person ID to assign the impressions. In a second example, one-off sign-on events can produce erroneous links. In this case, a link between the person ID and the device ID is observed and is correct at the moment it was observed, however, it is incorrect over time. A one-off use is not a strong enough link to determine ownership of the device ID and impression. This is further confirmed when sign-ins introduce new PII not previously associated with the device.

Such example behaviors can produce duplicated impressions. The impressions can be deduplicated by observing how frequently PII interact with distinct devices relative to the other devices in the LLC and grouping together those that interact most frequently. In some examples, deduplicating impressions relies on assuming each device has a primary user, even if that user does not solely interact with the selected device. Once deduplicated, the data can provide a reference for which impressions are correlated with each person. The device-to-person relationship and inferred ownership information may also be used to assign or infer demographic variables of the device user.

Example approaches disclosed herein access link impression data from a database proprietor. Example links can include email addresses, cookie IDs, mobile ad IDs (AAID, IDFA), UID 2.0, smart TV IDs, IP addresses (IPv4 & IPv6), ZIP 11, Names, Addresses, and third-party IDs such as Experian ID (PID, LUID), or any combination, variation (e.g., a portion of an email address), or derivation thereof (e.g., a hashed representation of an email address). The links are used to form a graph of all devices where each device is represented by a single node and is linked by PII to other associated devices in the graph.

Example approaches disclosed herein deduplicate the impression data using a device graph that is created using a community detection algorithm. Using a full device graph, the initial value of the objective function of the algorithm is calculated. For each node, possible "moves", i.e. the allocation of the given node to the community of a neighboring node, are found. For each move, the change in the objective function value is calculated. Based on the changes to the objective function, nodes are switched from the original community to the community that maximizes the objective function and combined into new community clusters. This is repeated until conversion of the algorithm. It leads to the grouping together graph nodes that interact more amongst themselves than with nodes in other communities. After convergence, at the point of deduplication, communities represent a plurality of devices assigned to a single user. In some examples, the creation of communities can include Upon the completion of the community detection process, the communities of each node are saved, and a snapshot including a device-to-person link lookup is created. This snapshot can be used for the deduplication of impression data from the device level to the person level. The snapshot is, in some examples, compared with known panelist data for accuracy, quality, and stability over time. The deduplicated data is analyzed to determine if the number of persons associated with each device is nominal, and to see how many devices change their person ID or demographic assignment over time. The deduplicated data is used for user identification and audience measurement.

Using the example approaches disclosed herein, by receiving and deduplicating impression data and preparing an ID resolution snapshot, the resulting deduplicated media impressions can be more accurately utilized than duplicated data. In addition, this can be achieved without relying solely on historically exercised methods of impression collection such as using database proprietors, third party cookies or ad identifiers. Deduplicated impressions more accurately represent which individuals are linked to which devices. Additionally, aggregations of previously deduplicated media impressions can be compared to recently deduplicated impressions and panelist data to determine relative accuracy and consistency of the recent data. This method of data deduplication is more versatile than alternatives as any data that provides PII to device links (or any other type of links) can be used.

FIG. 1 is a block diagram 100 illustrating interaction between the device users 102, user computing devices 104, a network 106, a database proprietor 107, an audience measurement entity 108, and a central facility 109 to collect media impressions. The device users 102 are any individuals who consume and interact with media using, for example, user computing devices 104, and/or access media over the network. Media can be any digital content (e.g., website, video, music, video game, podcast, audio book, e-book, online gambling, television show, movie, etc.). In some examples, device users 102 are panelist participants and preemptively contribute their impression data and demographic information to audience measurement entity 108. As used herein, panelists are users registered on panels maintained by a ratings entity (e.g., an audience measurement company) that owns and/or operates the ratings entity subsystem. In other examples, device users 102 are anonymous individuals, or are both panelist participants and anonymous individuals. Device users 102 interact with user computing devices 104 and generate impressions through their activity.

User computing devices 104 communicate data across network 106 to audience measurement entity 108. In some examples, the user computing device 104 is capable of directly presenting media (e.g., via a display) while, in other examples, the user computing device 104 presents the media on separate media presentation equipment (e.g., speakers, a display, etc.). Thus, as used herein "computing devices" may or may not be able to present media without assistance from a second device. Computing devices are typically consumer electronics. For example, the user computing device 104 of the illustrated example can be a personal computer such as a laptop computer, and thus, is capable of directly presenting media (e.g., via an integrated and/or connected display and speakers). While in the illustrated example, personal computing devices are shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used. The data communicated via the network 106 to audience measurement entity 108 are media impressions with one or more links (e.g., PII to device links).

The example network 106 of FIG. 1 is the Internet. However, the example network 106 may be implemented using any other network over which data can be transferred (e.g., private network, Virtual Private Network, the Internet, Local Area Network, Wide Area Network, wireless network, cellular network, etc.). In some examples, the network 106 is not always connected to the user computing devices 106. In other examples, the user computing devices 106 send data to the network 106 continuously, at regular intervals, and/or upon request.

The example database proprietor 107 of FIG. 1 is an online service provider with which device users 102 can be registered users (e.g., social media company, cloud server manager, etc.) The database proprietor 107 collects data about the device users 102 (e.g., demographics, location, impressions, etc.). In some examples, the database proprietor 107 provides online advertisement tracking to third parties, like the audience measurement entity 108. In other examples, the device users 102 are not registered users with the database proprietor 107 but may still interact with media associated with, or be tracked by the database proprietor 107.

The audience measurement entity 108 stores and processes data transferred from user computing devices 104. Audience measurement entity 108 can be, in some examples, a monitoring company. Monitoring companies desire knowledge on how users interact with media devices such as smartphones, tablets, laptops, smart televisions, etc. In particular, media monitoring companies want to monitor media presentations made at the media devices to, among other things, monitor exposure to advertisements, determine advertisement effectiveness, determine user behavior, identify purchasing behavior associated with various demographics, etc. Data transferred to the audience measurement entity 108 may be edited and may also be deleted or stored after it is used. In some examples, impression data is transferred to audience measurement entity 108 from database proprietor 107. The data from database proprietor 107 can include demographic data associated with device users 102. FIG. 1 has a single connection between device users 102 and user computing devices 104, but many different device users 102 may be interacting with many different user computing devices 104. For clarity, in FIG. 1 device users 102 include 3 distinct example users, and user computing devices 104 include three unique example devices with a single connection between them. This is merely representative and at any given time many different example users and example devices may be interacting. In addition, any quantity of example devices may be communicating with audience measurement entity 108 over network 106.

The central facility 109 of the illustrated example of FIG. 1 is a server and/or other computing environment operated by the audience measurement entity 108. The example central facility 109 receives and processes the impression data from audience measurement entity 108. In some examples, the data is modified by the audience measurement entity 108 before being transferred to central facility 109. In other examples, the data from the database proprietor 107 is combined with additional data by the audience measurement entity 108. Data can be provided to the central facility 109 for example, at regular intervals or upon request.

Figure 2:
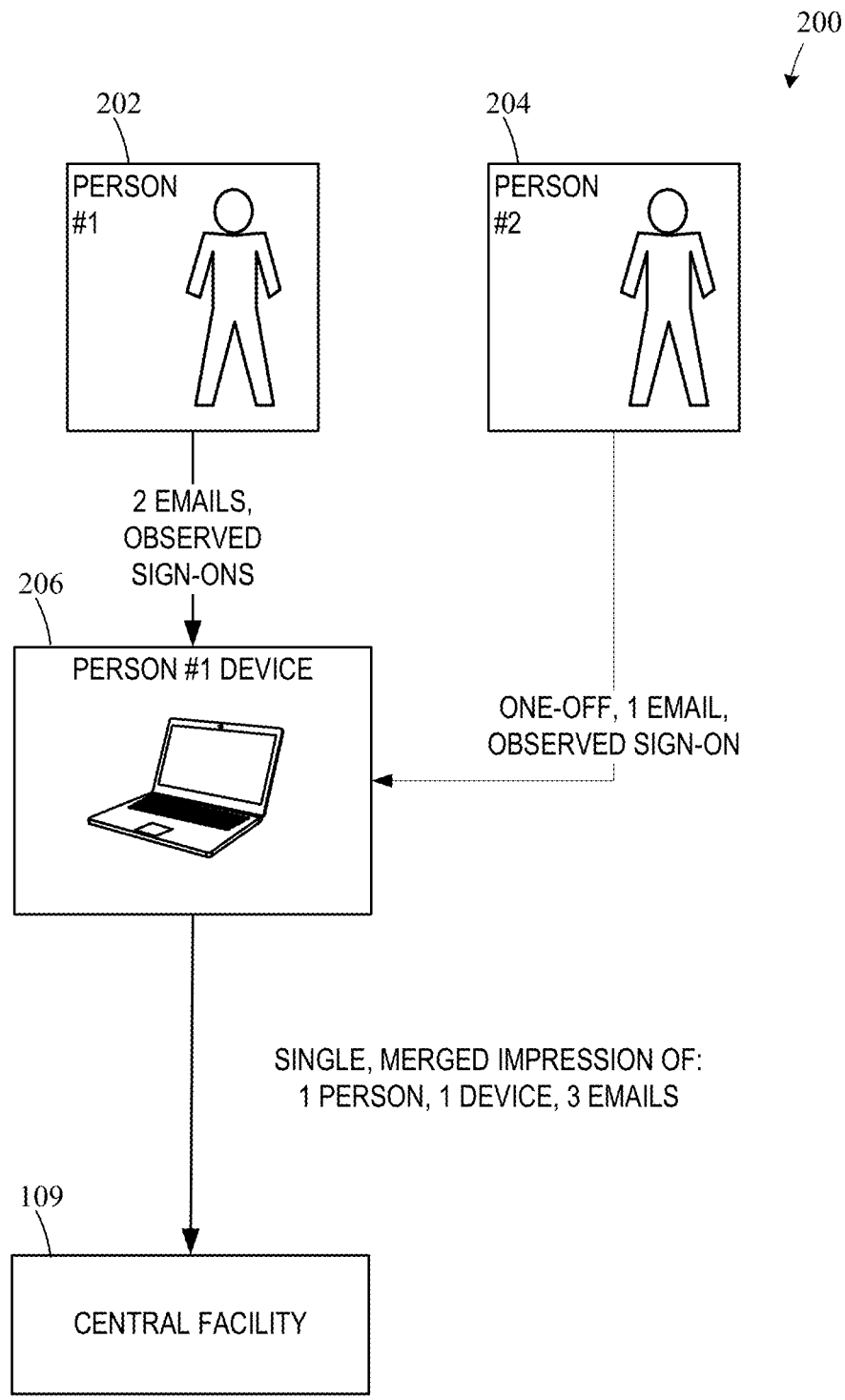
FIG. 2 is a block diagram illustrating an example of the development of a duplicate impression.

FIG. 2 is a block diagram 200 illustrating the development of an example duplicated impression sent to central facility 108. A person #1 202 uses two email accounts and interacts with, and signs-in to a person #1 device. As person #1 202 uses person #1 device 206 over time, sign-ins and interactions are observed by person #1 device and audience measurement entity 108 creates a strong association between person #1 202 ID and person #1 device 206 ID. When a person #2 204 signs in with their email in a one-off, observed sign-in, a new impression is created connecting person #1 202 and person #2 204 with person #1 device 206. The audience measurement entity 108 perceives this new impression as a single, merged, impression of 1 person with three emails and one device. Person #1 202 impressions should have been separate from the one-off impression of person #2 204. In FIG. 2, email sign-ins are used as an example interaction that produces impressions. The impression data created from a person to device interaction can be any known link (e.g., a PII to device link).

Figure 3:
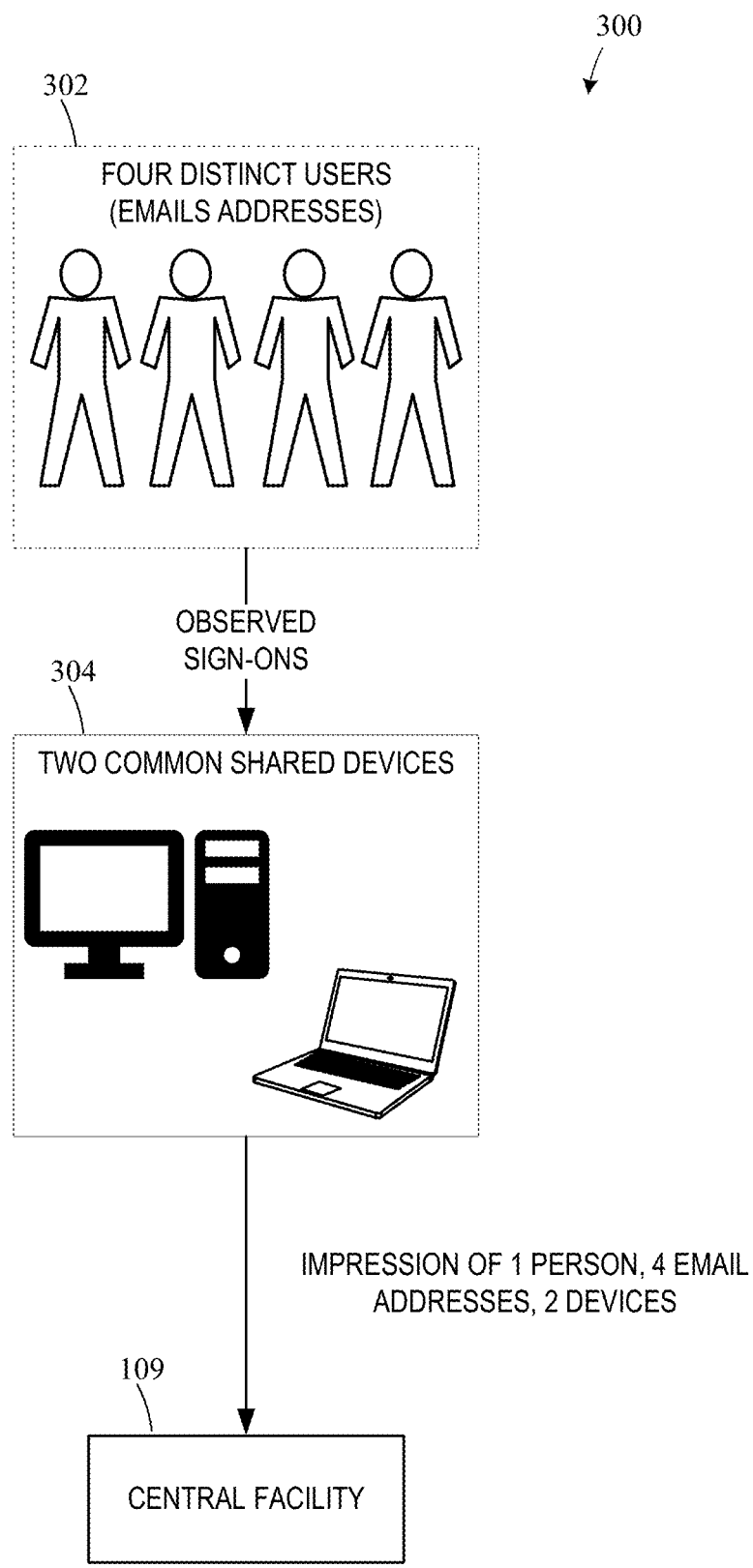
FIG. 3 is a block diagram illustrating an alternative example of the development of a duplicate impression.

FIG. 3 is a block diagram 300 illustrating the development of a second example duplicated impression recorded by audience measurement entity 108. Four distinct users 302 use a number of email addresses and interact with two common shared devices 304 habitually. All four distinct users 302 interactions are associated with two common shared devices 304 and produce impressions through observed sign-on. The habitual interaction of a collection of users with a collection of shared devices produces duplicated impressions. In this case, audience measurement entity 108 records impressions of one person, four email addresses and two devices. For clarity, in FIG. 3 four distinct users 302 is an example number of users and two common shared devices 304 is an example number of shared devices. This is merely representative and at any given time many different example users and example devices may be interacting. In addition, any quantity of example shared devices may be communicating with audience measurement entity 108 over network 106. In FIG. 3, email sign-ins are used as an example interaction that produces impressions. The impression data created from a person to device interaction can be any known link (e.g., a PII to device link).

Figure 4:
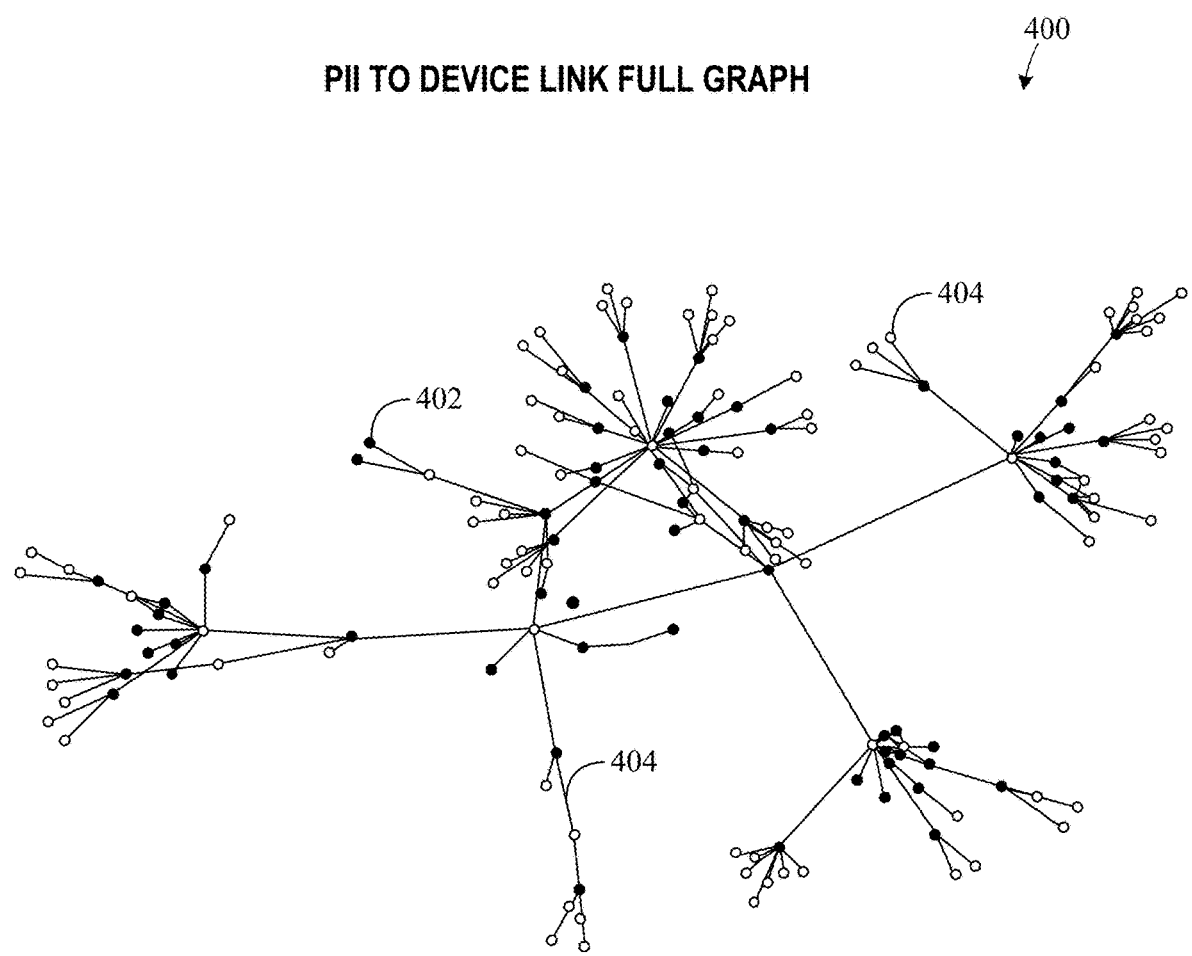
FIG. 4 is an example device graph based on personally identifiable information to device links.

FIG. 4 is an example device graph 400 created from personally identifiable information to device links. In the device graph, links (e.g., a PII to device link) are shown. In the example device graph of FIG. 4, hashed emails are represented by empty dots 404, and devices are represented by shaded dots 402 and are connected by observed sign-ins and/or interactions 404 represented by lines. While hashed emails are used as example PII, PII are not limited to hashed emails for such links (e.g., a PII to device link). In this example device graph, devices and hashed email interactions connect and associate many more devices than could plausibly be owned or used by a single person.

Figure 5:
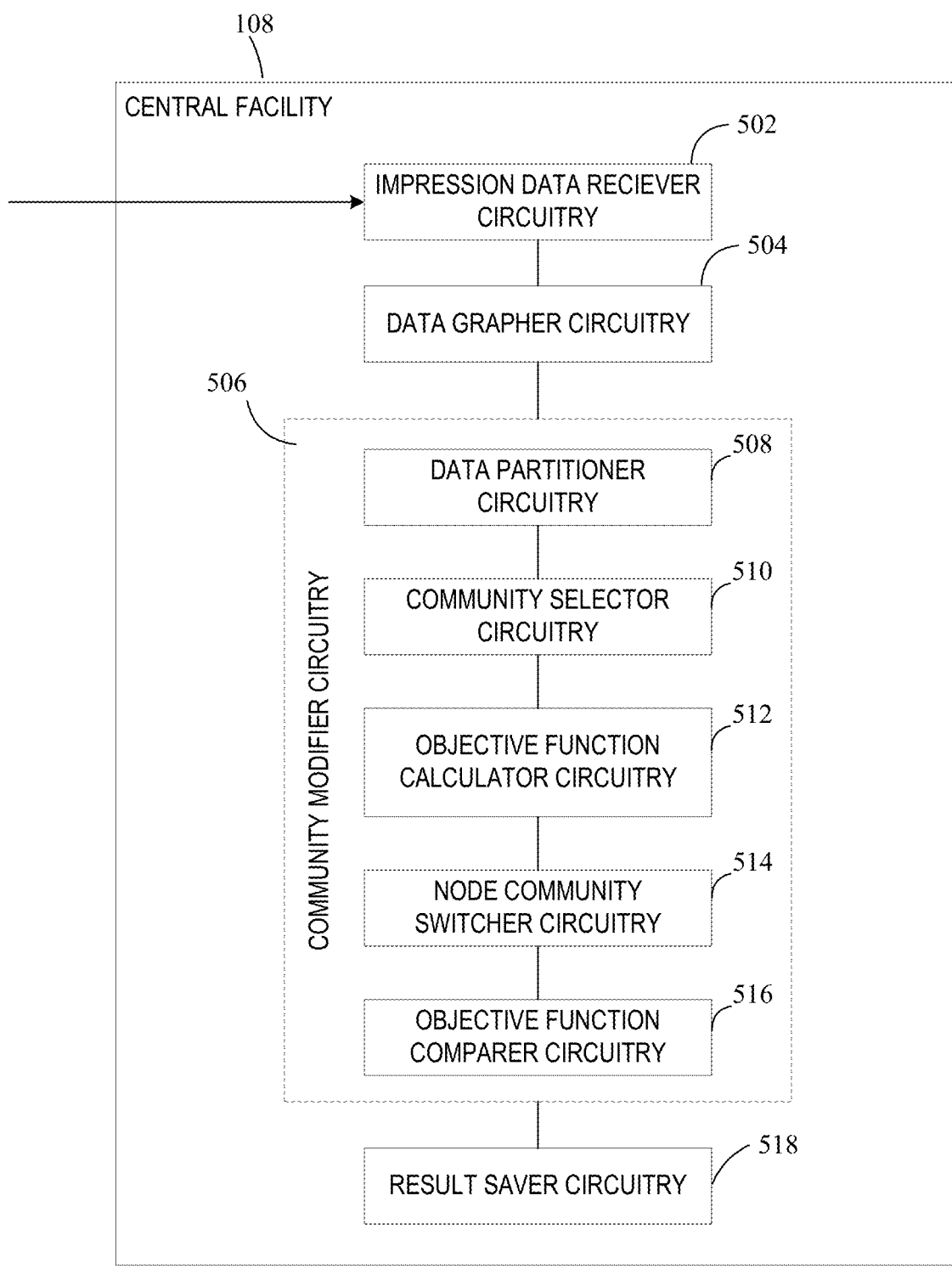
FIG. 5 is a block diagram illustrating an example implementation of the example central facility of FIG. 1.
Figure 6:
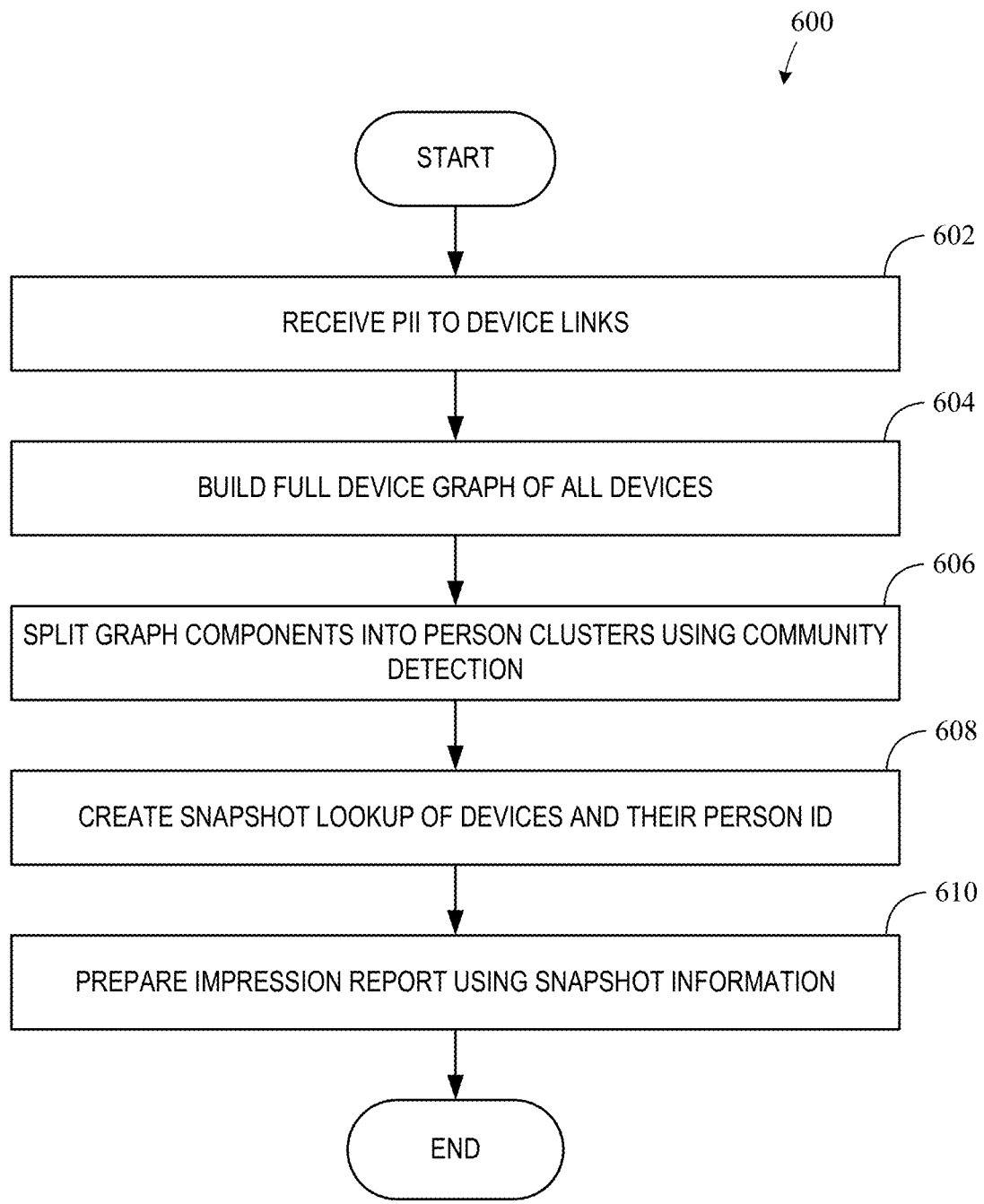
FIG. 6 is a flowchart representative of example machine readable instructions that may be executed by example processor circuitry to implement the example central facility of FIGS. 1, 2, 3, and/or 5 to deduplicate impressions.

FIG. 5 is a block diagram illustrating an example implementation of the example central facility 109 of FIG. 1 to execute the example machine readable instructions of FIG. 6, 8, and/or 9. The example central facility 109 includes impression data receiver circuitry 502, data grapher circuitry 504, community modifier circuitry 506, data partitioner circuitry 508, community selector circuitry 510, objective function calculator circuitry 512, node community switcher circuitry 514, objective function comparer circuitry 516, and result saver circuitry 518.

The example impression data receiver circuitry 502 receives impression data from the database proprietor 107 as links (e.g., PII to device links). The link data can include any personally identifiable information that is linked to device including email addresses, cookie IDs, mobile ad IDs (AAID, IDFA), UID 2.0, smart TV IDs, IP addresses (IPv4 & IPv6), ZIP 11, Names, Addresses, and third-party IDs such as Experian ID (PID, LUID), or any combination, variation (e.g., a portion of an email address), or derivation thereof (e.g., a hashed representation of an email address). The example impression data receiver circuitry 502 receives the data from database proprietor 107 for example, over the internet, via cloud-based storage, or via a server. In some examples, the data is received continually as impressions are generated. In other examples, the data is received in bulk at regular intervals, and/or upon request.

The example data grapher circuitry 504 graphs the links (e.g., PII to device links). In some examples, the example data grapher circuitry 504 produces a graph similar to the example device graph of FIG. 4. The data grapher circuitry 504 can be implemented to output the graph visually or can be implemented to structure and prepare the data for community detection.

The community modifier circuitry 506 splits the graph components into person clusters using community detection. In some examples, community modifier circuitry 506 implements data partitioner circuitry 508, community selector circuitry 510, objective function calculator circuitry 512, node switcher community 514, and objective function comparer circuitry 516 to split graph components into person clusters. In some examples, the community modifier circuitry 506 implements the Louvain algorithm to quantify the degree to which communities interact among themselves relative to other communities.

The data partitioner circuitry 508 partitions the data into communities, where each community begins as a single device. In some examples, devices can be linked to many different devices via PII or can be linked to one other device only. In some examples, the data partitioner circuitry 508 preserves a snapshot of the initial device graph and the communities and links contained in the snapshot.

The community selector circuitry 510 selects a community to be modified by the objective function calculator circuitry 512, node community switcher circuitry 514 and objective function comparer circuitry 516. In some examples, the community selector circuitry 510 selects the first listed community, and in other examples the community selector circuitry 510 determines which community to select based on which have already been selected and/or those that can be used to best simplify the dataset.

The objective function calculator circuitry 512 evaluates the data based on a set mathematical formula to evaluate the goodness of a given community partition for the graph. In some examples, the objective function calculator circuitry 512 utilizes an objective function to quantify the degree to which communities interact among themselves relative to with other communities. The objective function calculator circuitry 512 can utilize all or a portion of the data. In some examples, the objective function calculator circuitry calculates the change in the objective function for each graph modification initiated by the node community switcher circuitry 514.

The node community switcher circuitry 514 switches one or more nodes from one community to another to allow the objective function calculator circuitry 512 to calculate the change in objective function from each move. Once all possible moves have been attempted, the node community switcher circuitry 514 rearranges the nodes of the device graph based on the desired results of the objective function. In some examples, the node community switcher circuitry 514 can switch all possible nodes to a new community, while in others, not all nodes have their locations modified. Nodes can be switched into other large communities of nodes or can exist as their own community individually.

The objective function comparer circuitry 516 records and compares the results produced by the objective function calculator circuitry 512 based on the node switches from the node community switcher circuitry 514. Once all iterations are complete, the objective function comparer circuitry 516 can perform a final check to confirm if the results meet or exceed the desired outcome of the objective function. In some examples, the objective function comparer circuitry 516 can determine that no change (or only insignificant change) in objective function result occurred from switching a node, while in others, it will determine that a change did occur.

The result saver circuitry 518 saves the final device graph with device to person assignments. In some examples, the result saver circuitry 518 creates a snapshot lookup of all devices and their person ID. In some examples, the result saver circuitry 518 saves the final device graph data only temporarily.

In some examples, the central facility 109 includes means for accessing. For example, the means for accessing may be implemented by the impression data receiver circuitry 502. In some examples, the impression data receiver circuitry 502 may be implemented by machine executable instructions such as that implemented by at least block 602 of FIG. 6 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the impression data receiver circuitry 502 is implemented by other hardware logic circuitry, hardware implemented state machines, and/or any other combination of hardware, software, and/or firmware. For example, the impression data receiver circuitry 502 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 109 includes means for building. For example, the means for building may be implemented by the data grapher circuitry 504. In some examples, the data grapher circuitry 504 may be implemented by machine executable instructions such as that implemented by at least block 604 of FIG. 6, block 816 of FIG. 8, and/or block 916 if FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the data grapher circuitry 504 is implemented by other hardware logic circuitry, hardware implemented state machines, and/or any other combination of hardware, software, and/or firmware. For example, the data grapher circuitry 504 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 109 includes means for splitting. For example, the means for splitting may be implemented by the community modifier circuitry 506. In some examples, community modifier circuitry 506 may be implemented by machine executable instructions such as that implemented by at least block 606 of FIG. 6 and/or block 810 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the community modifier circuitry 506 is implemented by other hardware logic circuitry, hardware implemented state machines, and/or any other combination of hardware, software, and/or firmware. For example, the community modifier circuitry 506 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 109 includes means for creating and preparing. For example, the means for creating and preparing may be implemented by the result saver circuitry 518. In some examples, result saver circuitry 518 may be implemented by machine executable instructions such as that implemented by at least block 606 and 610 of FIG. 6 block 820 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the result saver circuitry 518 is implemented by other hardware logic circuitry, hardware implemented state machines, and/or any other combination of hardware, software, and/or firmware. For example, the result saver circuitry 518 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 11:
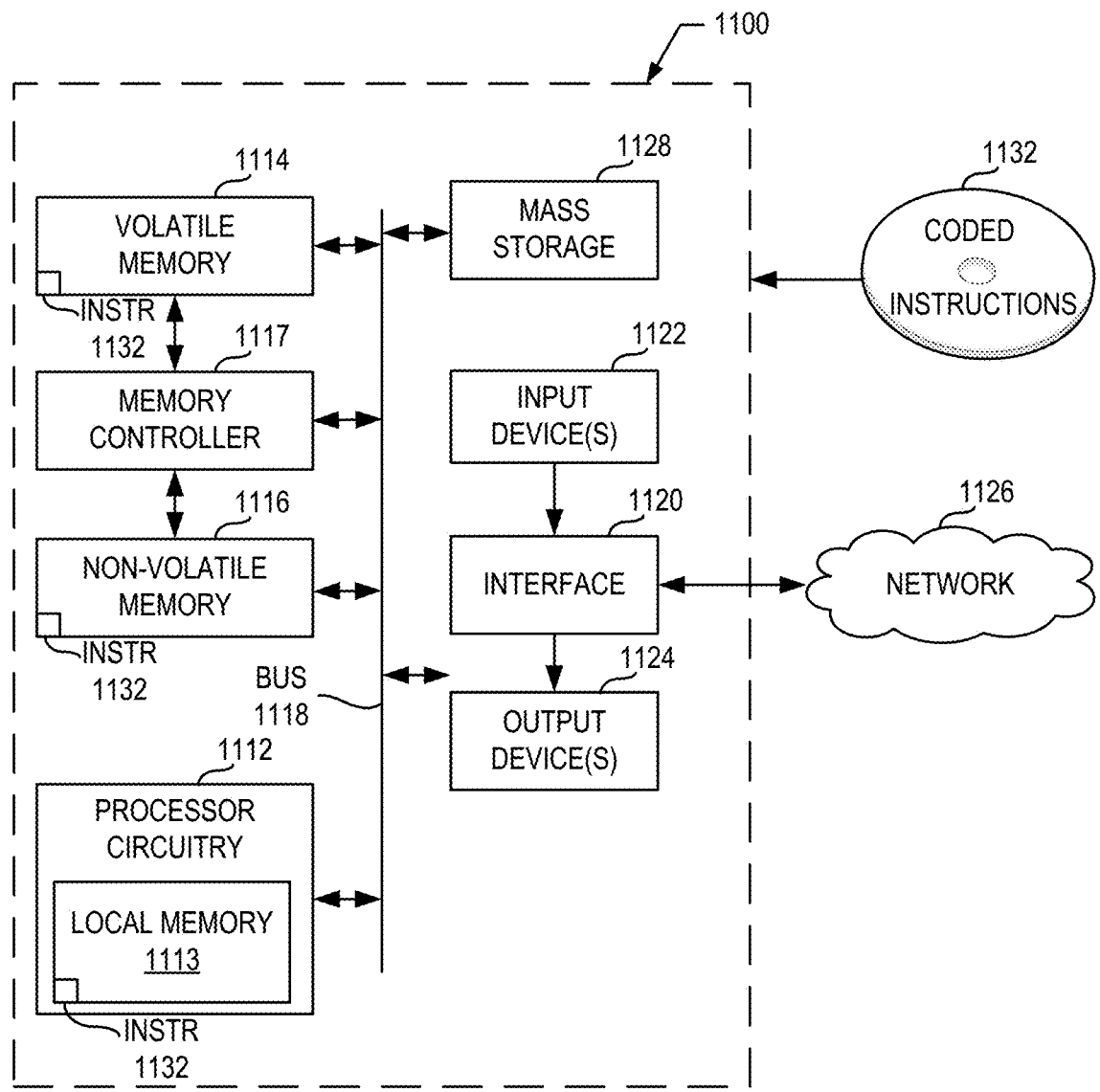
FIG. 11 is a block diagram of an example processing platform including processor circuitry structured to execute the example machine readable instructions of FIG. 6, 8, and/or 9 to implement the example central facility of FIG. 1.

While an example manner of implementing the central facility 108 of FIG. 5 is illustrated in FIG. 11, one or more of the elements, processes, and/or devices illustrated in FIG. 11 may be combined, divided, re-arranged, omitted, eliminated, and/or implemented in any other way. Further, the example impression data receiver circuitry 502, the example data grapher circuitry 504, the example community modifier circuitry 506, the example data partitioner circuitry 508, the example community selector circuitry 510, the example objective function calculator circuitry 512, the example node community switcher circuitry 514, the example objective function comparer circuitry 516, and the example result saver circuitry 518 and/or, more generally, the example central facility 109 of FIG. 5, may be implemented by hardware, software, firmware, and/or any combination of hardware, software, and/or firmware. Thus, for example, any of the example impression data receiver circuitry 502, the example data grapher circuitry 504, the example community modifier circuitry 506, the example data partitioner circuitry 508, the example community selector circuitry 510, the example objective function calculator circuitry 512, the example node community switcher circuitry 514, the example objective function comparer circuitry 516, and the example result saver circuitry 518 and/or, more generally, the example central facility 109, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example impression data receiver circuitry 502, the example data grapher circuitry 504, the example community modifier circuitry 506, the example data partitioner circuitry 508, the example community selector circuitry 510, the example objective function calculator circuitry 512, the example node community switcher circuitry 514, the example objective function comparer circuitry 516, and/or the example result saver circuitry 518 is/are hereby expressly defined to include a non-transitory computer readable storage device or storage disk such as a memory, a digital versatile disk (DVD), a compact disk (CD), a Blu-ray disk, etc., including the software and/or firmware. Further still, the example central facility 109 of FIG. 5 may include one or more elements, processes, and/or devices in addition to, or instead of, those illustrated in FIG. 11, and/or may include more than one of any or all of the illustrated elements, processes and devices.

A flowchart representative of example hardware logic circuitry, machine readable instructions, hardware implemented state machines, and/or any combination thereof for implementing the central facility 109 of FIGS. 1 and/or 5 is shown in FIG. 11. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 6, 8, and/or 9, many other methods of implementing the example central facility 109 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6, 8, and/or 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 12:
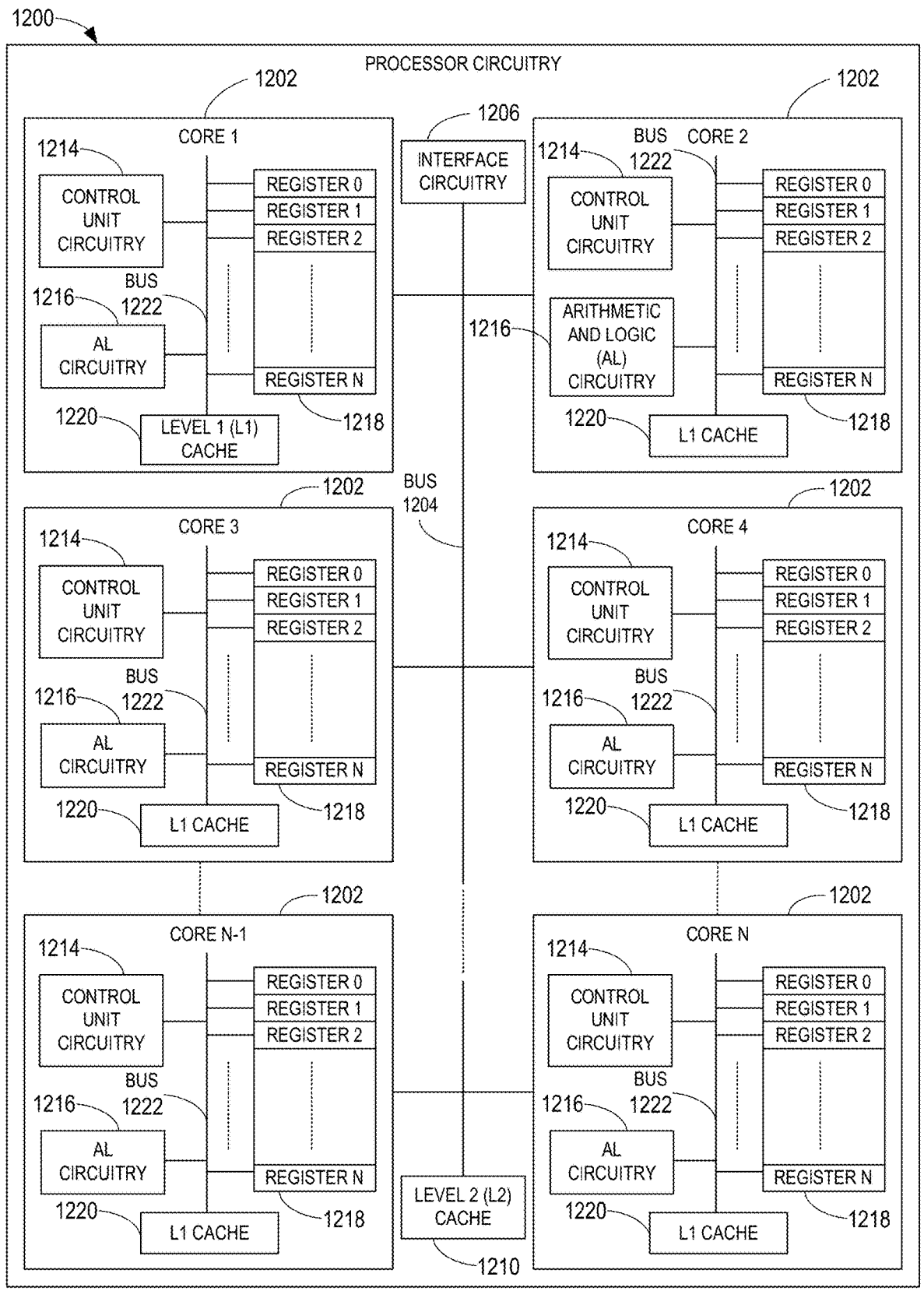
FIG. 12 is a block diagram of an example implementation of the processor circuitry of FIG. 11.
Figure 13:
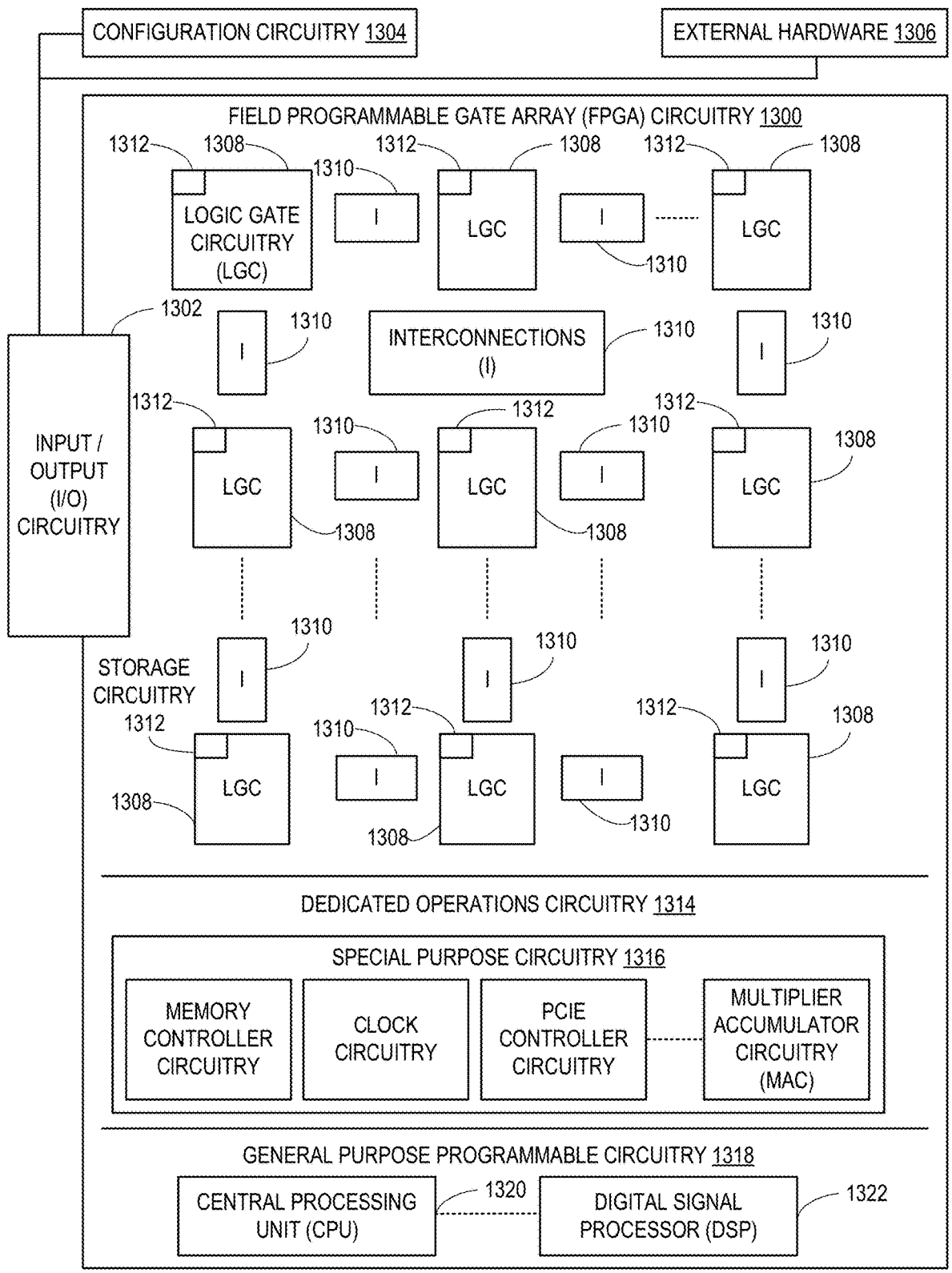
FIG. 13 is a block diagram of another example implementation of the processor circuitry of FIG. 4.

FIG. 6 is a flowchart representative of example machine readable instructions 600 that may be executed by the example processor circuitry of FIGS. 12 and 13 to implement the example central facility 109 of FIG. 5. The example machine readable instructions 600 of FIG. 6 begin at block 602 where the impression data receiver circuitry 502 receives links (e.g., PII to device links). (Block 602).

The example data grapher circuitry 506 builds a full device graph of all devices using the link data received by the impression data receiver circuitry 502. (Block 604). The link data can include any personally identifiable information that is linked to device including email addresses, cookie IDs, mobile ad IDs (AAID, IDFA), UID 2.0, smart TV IDs, IP addresses (IPv4 & IPv6), ZIP 11, Names, Addresses, and third-party IDs such as Experian ID (PID, LUID), or any combination, variation (e.g., a portion of an email address), or derivation thereof (e.g., a hashed representation of an email address). . In some examples, the machine readable instructions of block 604 can utilize the data grapher circuitry 504 to output a graph visually or to structure and prepare the data for deduplication.

Community modifier circuitry 506 splits the graph components into person clusters using community detection. (Block 606). In some examples, the community modifier circuitry 506 implements the Louvain algorithm to quantify the degree to which communities interact among themselves relative to other communities to split graph components into person clusters. However, any other approaches and/or algorithm(s) may additionally or alternatively be used to quantify the degree to which communities interact among themselves relative to other communities. For example, a modified version of the Louvain algorithm may be used that enables parallel execution across multiple machines may be used.

Result saver circuitry 518 creates a snapshot containing a lookup of devices and their associated person ID. (Block 608). In some examples, the result saver circuitry 518 saves the data for purposes of result comparison. The result saver circuitry 518 can also be used to prepare an impression report using the snapshot information. (Block 610). The snapshot and impression report can be stored for comparison to future bodies of similar deduplicated data or can be discarded.

Figure 7:
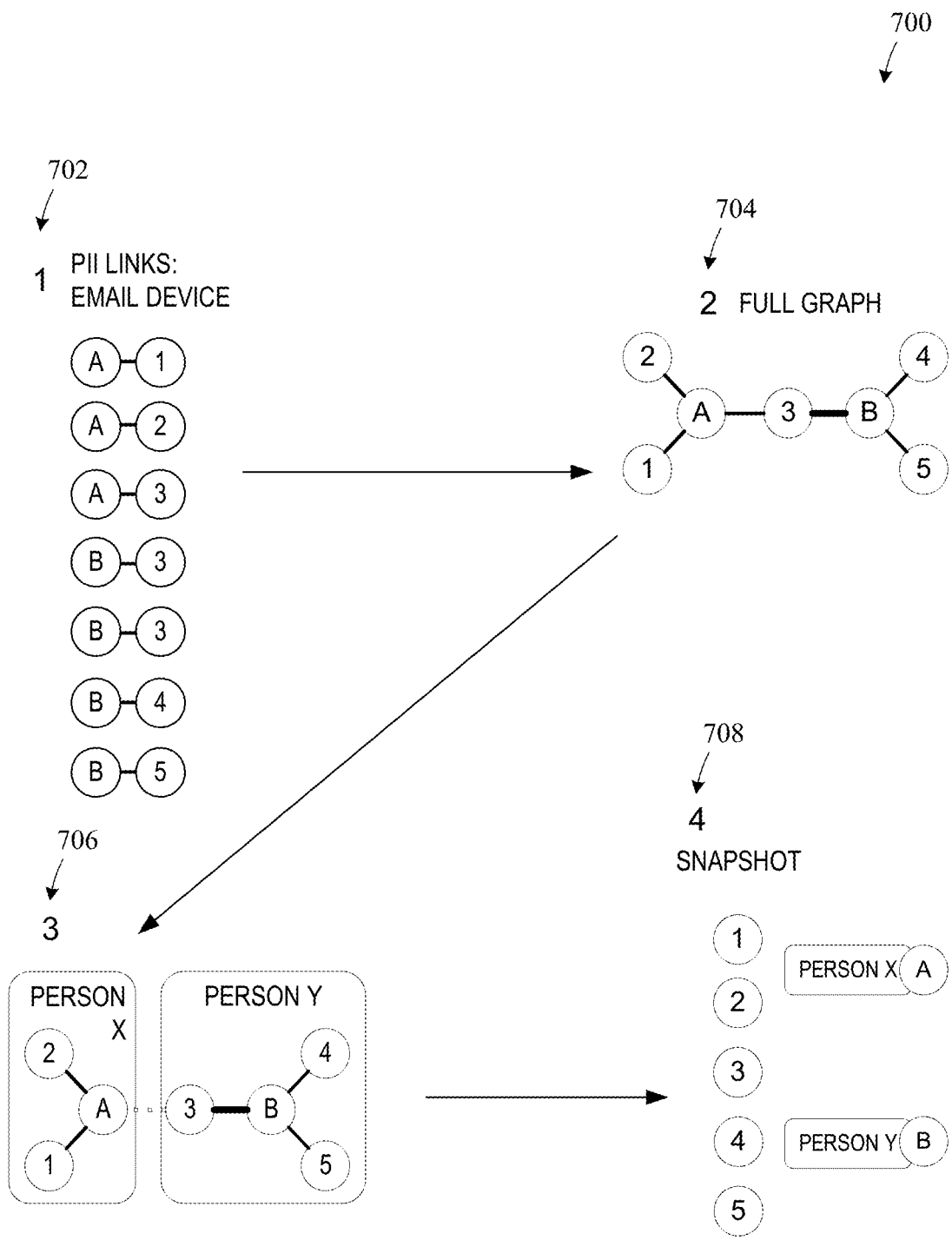
FIG. 7 is a diagram visually illustrating the example data deduplication process of FIG. 6.

FIG. 7 visually illustrates the example data deduplication process of the example computer readable instructions of FIG. 6. In Step 1 702, the links (e.g., PII to device links) are received as emails from devices they interact with clusters using computer readable instructions of block 602, executed by impression data receiver circuitry 502.

In Step 2 704, a full device graph is built from the link data clusters using the computer readable instructions of block 604, executed by data grapher circuitry 504. In the graph of Step 2 704, devices are represented by numbers 1-5 and emails are represented by letters A and B. Users are represented as Person X and Person Y.

In Step 3 706, the devices that most frequently interact with email A or email B are split into person clusters using the computer readable instructions of Block 606, executed by the community modifier circuitry 506. In this example, devices one and two most frequently interact with email A, and devices three, four, and five most frequently interact with email B forming the two person clusters of Person X and Person Y. While device 3 is connected to both Email A and Email B, Email B and device 3 are more strongly associated, as indicated by the thicker line between Email B and device 3 in Step 2. As expected, when the graph is split into person clusters in Step 3, device 3 is associated with Person Y and no longer with Person X.

In Step 4 708, a snapshot is created detailing a lookup of all devices, emails, and their person ID, using the computer readable instructions of Block 610, executed by the result saver circuitry 504. In some examples, an impression report can also be prepared using snapshot information.

Figure 8:
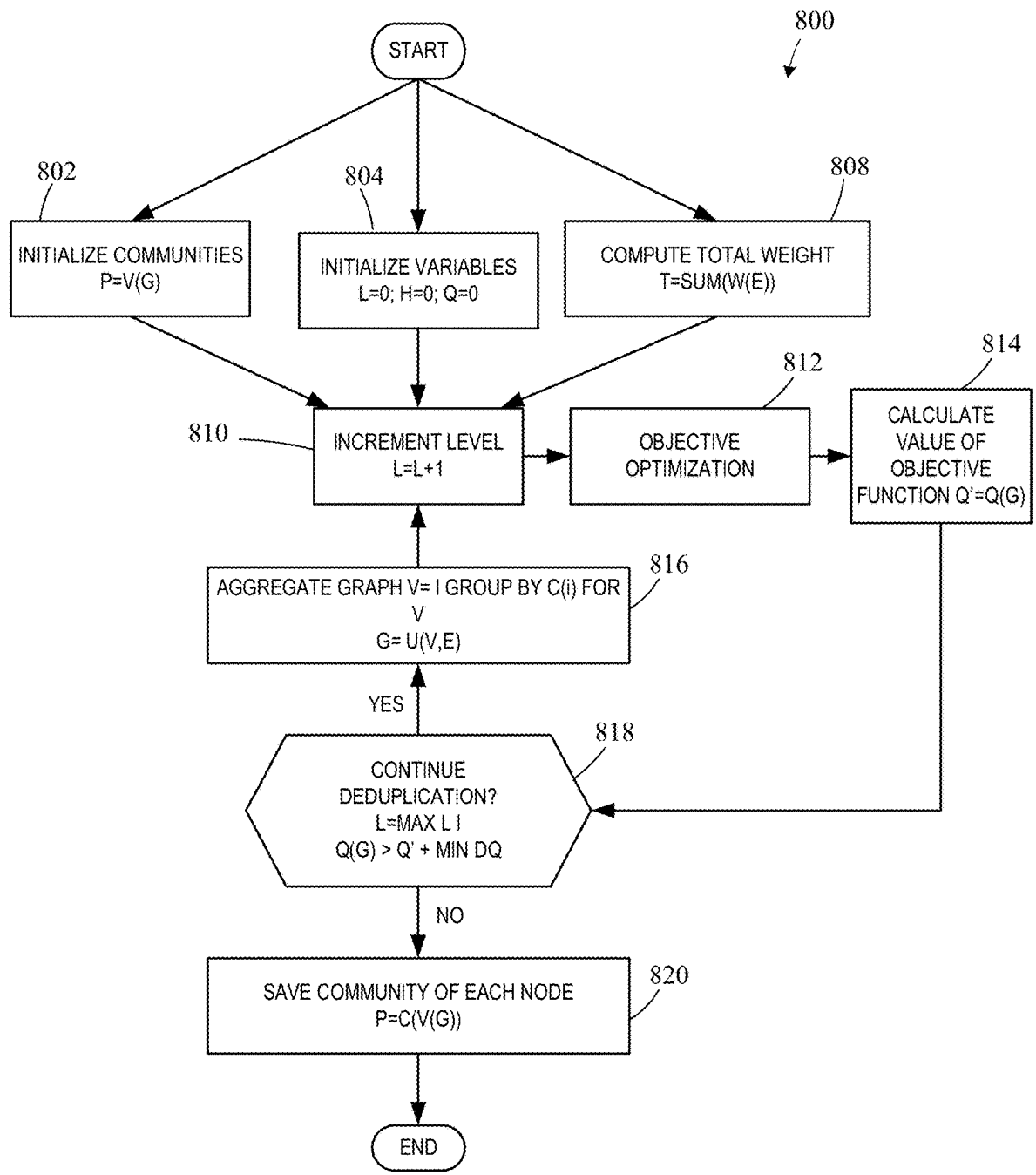
FIG. 8 is a flowchart representative of machine-readable instructions that may be executed by example processor circuitry to implement the example central facility of FIGS. 1, 2, 3, and/or 5 to deduplicate impressions.

FIG. 8 is a flowchart of example machine readable instructions 800 that may be executed by the example processor circuitry of FIGS. 12 and 13 to implement the example central facility 109 of FIG. 5. The example machine readable instructions 800 of FIG. 8 begin at block 802 where the data partitioner circuitry 508 initializes the communities as communities defined by a single device. (Block 802). In some examples, devices can be linked to many different devices via PII or can be linked to one other device only.

The variables of the example machine readable instructions are initialized. (Block 804). The total weight of the links between the PII and the devices is computed by implementing objective function calculator circuitry 512. (Block 808). In some examples, objective function calculator circuitry 512 utilizes a hierarchical clustering algorithm, for example, the Louvain algorithm, to quantify the degree to which communities interact among themselves relative to other communities. Objective function calculator circuitry 512 can utilize all or a portion of the data.

The level variable, in this case, 'L,' is incremented from zero. (Block 810). Utilizing community modifier circuitry 506, the objective function is optimized. (Block 812). In some examples, community modifier circuitry 506 implements data partitioner circuitry 508, community selector circuitry 510, objective function calculator circuitry 512, node switcher community 514 and objective function comparer circuitry 516 to split graph components into person clusters.

Following the optimization of the objective function, the new value of the objective function is computed by implementing objective function calculator circuitry 512. (Block 814). If the original value of the objective function is more than the new value of the objective function summed with the minimum improvement value (e.g., block 818 returns a result of YES), community detection continues, and the graph is updated by grouping the communities of the graph of the edges and vertices by implementing node community switcher circuitry 514. (Block 816). If the original value of the objective function is less than the new value of the objective function summed with the minimum improvement value (e.g., block 818 returns a result of NO), the community detection algorithm is stopped, and the communities of each node are saved by implementing result saver circuitry 518. (Block 820). In some examples, the result saver circuitry 518 creates a snapshot lookup of all devices and their person ID. In other examples, the result saver circuitry 518 prepares an impression report using snapshot information and/or executes the data grapher circuitry 504 to build a new device graph from the aggregated data. In some examples, result saver circuitry 518 saves the aggregated data only temporarily.

Figure 9:
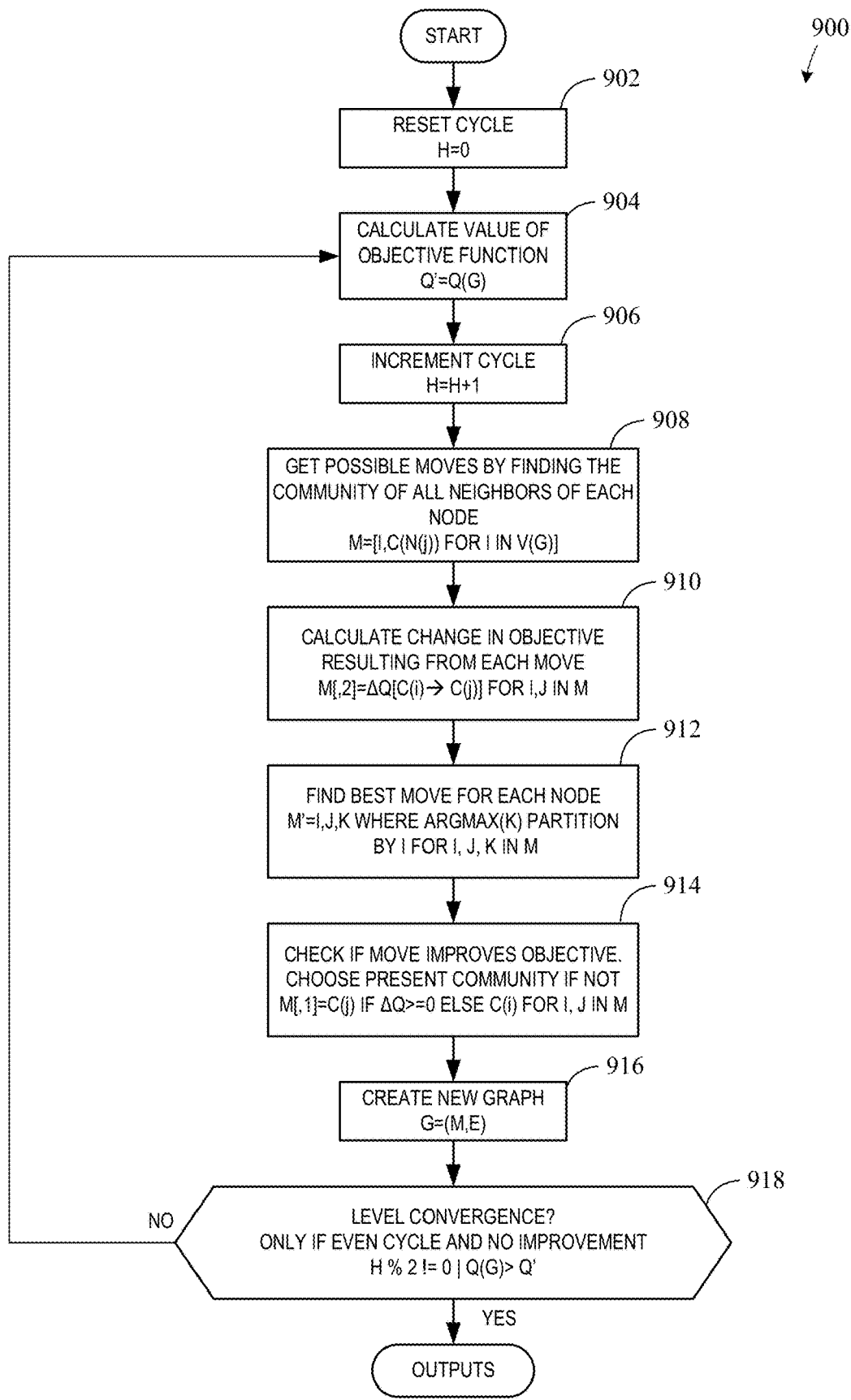
FIG. 9 is a flowchart representative of machine-readable instructions that may be executed by example processor circuitry to implement the example central facility of FIG. 1, 2, 3, and/or 5 and the machine-readable instructions on FIG. 8 to deduplicate impressions.

FIG. 9 of example machine readable instructions 900 that may be executed by the example processor circuitry of FIGS. 12 and 13 to implement the example central facility 109 of FIG. 5. The example machine readable instructions 900 of FIG. 9 begin at block 902 where the cycle variable is reset to zero (Block 802). Utilizing the objective function calculator circuitry 512, the value of the objective function is calculated (Block 904). In some examples, objective function calculator circuitry 512 utilizes a variation of the Louvain algorithm, to quantify the degree to which communities interact among themselves relative to other communities. Objective function calculator circuitry 512 can utilize all or a portion of the data.

The cycle variable, in this case, is incremented. (Block 906). Possible moves are identified by finding the community of all neighbors of each node. (Block 908). Such possible node moves are retrieved by finding the community of all neighbors of each node by executing the community selector circuitry 510. (Block 910). From the set of possible node moves, the example community selector circuitry 510 finds a move that would maximize the objection function if the node was moved to the new neighboring community.

The change in the value of the objective function resulting from each possible move is calculated by the objective function calculator circuitry 512. (Block 912). The move for each node that maximizes the objective function is found by utilizing the node community switcher circuitry 514 and the objective function comparer circuitry 516. (Block 912). In some examples, the objective function comparer circuitry 516 determines that no change in objective function result occurred from switching a node, while in others, the objective function comparer circuitry 516 determines that a change did occur.

A check is conducted utilizing the objective function comparer circuitry 516 to see if each move improves the objective function. If so, the move is initiated. If the move is not initiated, the node remains at the present community.

(Block 914). A new graph is created containing the node moves using example data grapher circuitry 504. In some examples, the example data grapher circuitry 504 produces a graph similar to the example device graph of FIG. 4. (Block 916). If the level has converged (Block 918), the new device graph is output and saved by result saver circuitry 518. In examples disclosed herein, convergence is detected when the cycle variable 'H' is an even number, and there is no sufficient improvement in the objective function. However, any other approach to determining if convergence has been achieved may additionally or alternatively be used. If convergence is not achieved (e.g., block 918 returns a result of NO), (e.g., if the cycle variable 'H' is not an even number and/or there no improvement), control returns to block 904, where the process of blocks 904 through 908 is repeated until convergence is achieved.

FIG. 10 is a diagram 1000 displaying run times of various algorithms for example bodies of graph data. In FIG. 10, run times are displayed for different algorithms and bodies of linked data. The number of nodes and edges are noted for each body of data and the corresponding run time for each algorithm. In some examples, the computer readable instructions of FIG. 6, 8, and/or 9 implement the circuitry structure of FIG. 5 to run the Louvain algorithm 1002. Of the algorithms and data sets tested, the Louvain algorithm performs fastest 1006 and can manage the largest bodies of data sets 1004. It also produces the highest modularity score 1008. In some examples, the Louvain algorithm is chosen as opposed to other approaches, as the Louvain algorithm is faster, more versatile, and/or more accurate than such other approaches.

FIG. 11 is a block diagram of an example processor platform 1100 structured to execute and/or instantiate the machine readable instructions and/or operations of FIGS. 6, 8, and/or 9 to implement the apparatus of FIG. 5. The processor platform 1100 can be, for example, a server, a personal computer, a workstation, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements impression data receiver circuitry 502, data grapher circuitry 504, community modifier circuitry 506, data partitioner circuitry 508, community selector circuitry 510, objective function calculator circuitry 512, node community switcher circuitry 514, objective function comparer circuitry 516, and result saver circuitry 518.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 6, 8, and/or 9, may be stored in the mass storage device 1128, in the volatile memory 1114, in the non-volatile memory 1116, and/or on a removable non-transitory computer readable storage medium such as a CD or DVD.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIG. 6, 8, and/or 9.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1220 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIG. 6, 8, and/or 9 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIG. 6,8, and/or 9. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIG. 6, 8, and/or 9. As such, the FPGA circuitry 1300 may be structured to effectively instantiate some or all of the machine readable instructions of the flowchart of FIG. 6, 8, and/or 9 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIG. 6, 8, and/or 9 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIG. 6, 8, and/or 9 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIG. 6, 8, and/or 9 may be executed by one or more of the cores 1202 of FIG. 12 and a second portion of the machine readable instructions represented by the flowcharts of FIG. 6, 8, and/or 9 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
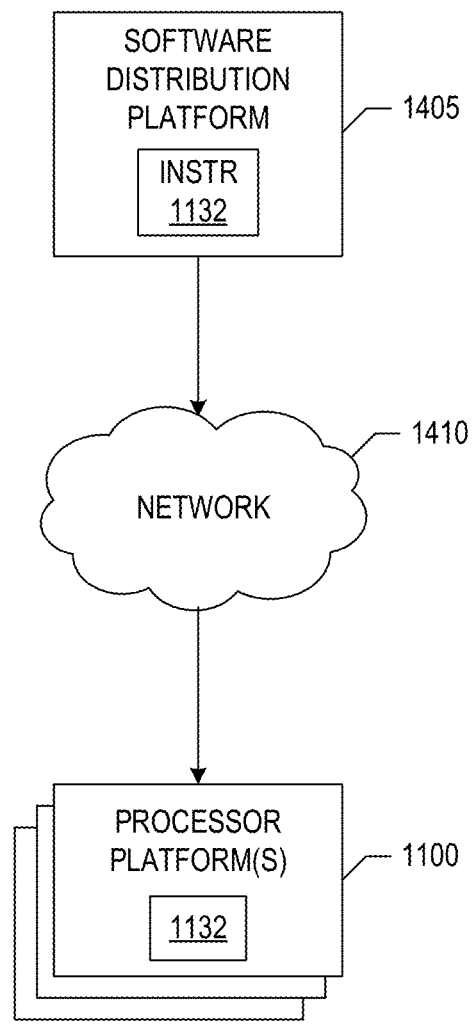
FIG. 14 is a block diagram of an example software distribution platform (e.g., one or more servers) to distribute software (e.g., software corresponding to the example machine readable instructions of FIGS. 6, 8 and 9 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions of FIGS. 6, 8, and/or 9, as described above. The one or more servers of the example software distribution platform 1405 are in communication with a network 1410, which may correspond to any one or more of the Internet and/or any of the example networks 1126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 1132 of FIG. 11, may be downloaded to the example processor platform 1100, which is to execute the machine readable instructions 1132 to implement the example central facility 109. In some example, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that identify users via community detection. The disclosed systems, methods, apparatus, and articles of manufacture allow for user identification of disparate electronic devices and therefore enable the deduplication of impressions from the device level to the person level. To that end, examples disclosed herein improve the efficiency of using a computing device by reducing duplicate media monitoring records. Such reductions in monitoring records require less computing resources to store, process, and transmit. As a result, less memory resources are required, less compute resources are required, and less communication resources are required, thereby freeing up such computing resources for other tasks. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for user identification via community detection and deduplication are disclosed herein. Further examples and combinations thereof include the following:

Example 1 includes an apparatus to generate a model comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate impression data receiver circuitry to access personally identifiable information to device links, data grapher circuitry to build a device graph based on the personally identifiable information to device links, community modifier circuitry to split components of the device graph into person clusters using community detection, and result saver circuitry to create a snapshot including a device-to-person link lookup, and to prepare a person-level impression measurement report from the snapshot.

Example 2 includes the apparatus of example 1, wherein the impression data receiver circuitry is to access the personally identifiable information from a database proprietor.

Example 3 includes the apparatus of example 1, wherein the community modifier circuitry is to initialize communities from the personally identifiable information to device links, each community representative of a distinct device.

Example 4 includes the apparatus of example 1, wherein the data grapher circuitry is to create a new device graph from the device-to-person link lookup.

Example 5 includes at least one non-transitory computer readable storage medium comprising instructions that, when executed, cause at least one processor to at least access personally identifiable information to device links, build a device graph based on the personally identifiable information to device links, split components of the device graph into person clusters using community detection, create a snapshot including a device-to-person link lookup, and prepare a person-level impression measurement report from the snapshot.

Example 6 includes the at least one non-transitory computer readable storage medium of example 5, wherein the personally identifiable information is accessed from a database proprietor.

Example 7 includes the at least one non-transitory computer readable storage medium of example 5, wherein the instructions, when executed, cause the at least one processor to initialize communities from the personally identifiable information to device links, each community representative of a distinct device.

Example 8 includes the at least one non-transitory computer readable storage medium of example 5, wherein the instructions, when executed, cause the at least one processor to create a new device graph from the device-to-person link lookup.

Example 9 includes the at least one non-transitory computer readable storage medium of example 5, wherein the instructions, when executed, further cause the at least one processor to split components of the device graph into person clusters based on a degree to which components interact among themselves as compared to interaction with other components.

Example 10 includes the at least one non-transitory computer readable storage medium of example 5, wherein the instructions, when executed, further cause the at least one processor to compare, before the splitting of the components, an initial value of an objective function, with a final value of the objective function, after the splitting of the components.

Example 11 includes a method for user identification, the method comprising accessing personally identifiable information to device links, building a device graph based on the personally identifiable information to device links, splitting, by executing an instruction with at least one processor, components of the device graph into person clusters using community detection, creating a snapshot including a device-to-person link lookup, and preparing a person-level impression measurement report from the snapshot.

Example 12 includes the method of example 11, wherein the accessing of the personally identifiable information includes receiving the personally identifiable information to device links from a database proprietor.

Example 13 includes the method of example 11, further including initializing communities from the personally identifiable information to device links, each community representative of a distinct device.

Example 14 includes the method of example 11, further including creating a new device graph from the device-to-person link lookup.

Example 15 includes the method of example 11, further including splitting components of the device graph into person clusters based on a degree to which components interact among themselves as compared to interaction with other components.

Example 16 includes the method of example 11, further including comparing, before the splitting of the components, an initial value of an objective function, with a final value of the objective function, after the splitting of the components.

Example 17 includes an apparatus for user identification, the apparatus comprising means for accessing personally identifiable information to device links, means for building a device graph based on the personally identifiable information to device links, means for splitting components of the device graph into person clusters using community detection, and means for creating a snapshot including a device-to-person link lookup, the means for creating to prepare a person-level impression measurement report from the snapshot.

Example 18 includes the apparatus of example 17, wherein the means for accessing is to access the personally identifiable information from a database proprietor.

Example 19 includes the apparatus of example 17, further including means for initializing communities from the personally identifiable information to device links, each community representative of a distinct device.

Example 20 includes the apparatus of example 17, wherein the means for building is to create a new device graph from the device-to-person link lookup.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to modify personally identifiable information to device links comprising:
   memory; and
   processor circuitry including one or more of:
   at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
   a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry (ASIC) including logic gate circuitry to perform one or more third operations;

the processor circuitry to perform at least one of the first operations, the second operations or the third operations to instantiate:
  impression data receiver circuitry to access personally identifiable information to device links;
  data grapher circuitry to build a device graph based on the personally identifiable information to device links; and
  community modifier circuitry to split components of the device graph into person clusters using community detection, the community modifier circuitry including:
    data partitioner circuitry to partition the personally identifiable information to device links into communities, each community representative of a distinct device; and
    community selector circuitry to select a community to be modified.

2. The apparatus of claim 1, wherein the community selector circuitry is to select the community based on which communities have already been selected.

3. The apparatus of claim 1, wherein the community selector circuitry is to select the community based on which community simplifies the personally identifiable information to device links.

4. The apparatus of claim 1, wherein the processor circuitry is further to instantiate result saver circuitry to create a memory state image including a device-to-person link lookup, and to prepare a person-level impression measurement report from the memory state image.

5. The apparatus of claim 1, wherein modifying the community includes objective function calculator circuitry to evaluate the personally identifiable information to device links to determine community interactions.

6. The apparatus of claim 5, wherein the processor circuitry is further to instantiate node community switcher circuitry to switch at least one node from one community to another community for the objective function calculator circuitry to determine community interactions.

7. The apparatus of claim 6, wherein the processor circuitry is further to instantiate objective function comparer circuitry to record and compare the result produced by the objective function calculator circuitry based on the node switches from the node community switcher circuitry.

8. An apparatus for modifying personally identifiable information to device links comprising:
  at least one memory;
  machine readable instructions; and
  processor circuitry to execute the machine readable instructions to:
    access personally identifiable information to device links;
    build a device graph based on the personally identifiable information to device links;
    split components of the device graph into person clusters using community detection;
    create a memory state image including a device-to-person link lookup; and
    prepare a person-level impression measurement report from the memory state image.

9. The apparatus of claim 8, wherein the processor circuitry is further to execute the machine readable instructions to access the personally identifiable information from a database proprietor.

10. The apparatus of claim 8, wherein the processor circuitry is further to execute the machine readable instructions to initialize communities from the personally identifiable information to device links, each community representative of a distinct device.

11. The apparatus of claim 8, wherein the processor circuitry is further to execute the machine readable instructions to create a new device graph from the device-to-person link lookup.

12. The apparatus of claim 8, wherein the processor circuitry is further to execute the machine readable instructions to split components of the device graph into person clusters based on a degree to which components interact among themselves as compared to interaction with other components.

13. The apparatus of claim 8, wherein the processor circuitry is further to execute the machine readable instructions to compare, before the splitting of the components, an initial value of an objective function, with a final value of the objective function, after the splitting of the components.

14. A method for modifying personally identifiable information to device links, the method comprising:
  accessing personally identifiable information to device links;
  building a device graph based on the personally identifiable information to device links;
  splitting, by executing an instruction with at least one processor, components of the device graph into person clusters using community detection;
  partitioning the personally identifiable information to device links into communities, each community representative of a distinctive device; and
  selecting a community to be modified.

15. The method of claim 14, wherein the selecting of the community to be modified is based on a determination of which communities have already been selected.

16. The method of claim 14, wherein the selecting of the community to be modified is based on a determination of which community simplifies the personally identifiable information to device links.

17. The method of claim 14, further including:
  creating a memory state image including a device-to-person link lookup; and
  preparing a person-level impression measurement report from the memory state image.

18. The method of claim 14, further including evaluating the personally identifiable information to device links to determine community interactions.

19. The method of claim 18, further including switching at least one node from one community to another community to determine community interactions.

20. The method of claim 19, further including comparing a result produced from the evaluating of the personally identifiable information to device links based on the switching of at least one node from one community to another community.

* * * * *